United States Patent
Maruyama et al.

(10) Patent No.: US 7,831,792 B2
(45) Date of Patent: Nov. 9, 2010

(54) COMPUTER SYSTEM, DATA MIGRATION METHOD AND STORAGE MANAGEMENT SERVER

(75) Inventors: Tetsuya Maruyama, Kawasaki (JP); Masayasu Asano, Yokohama (JP); Masayuki Yamamoto, Sagamihara (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 835 days.

(21) Appl. No.: 11/609,438

(22) Filed: Dec. 12, 2006

(65) Prior Publication Data

US 2008/0104349 A1    May 1, 2008

(30) Foreign Application Priority Data

Oct. 25, 2006   (JP) .............................. 2006-289406

(51) Int. Cl.
*G06F 13/00* (2006.01)
*G06F 13/28* (2006.01)

(52) U.S. Cl. .................................................... 711/165
(58) Field of Classification Search .................. 711/165
See application file for complete search history.

(56) References Cited

U.S. PATENT DOCUMENTS

| | | | |
|---|---|---|---|
| 7,080,225 B1 * | 7/2006 | Todd | 711/165 |
| 2003/0093439 A1 | 3/2003 | Mogi et al. | |
| 2006/0047909 A1 * | 3/2006 | Takahashi et al. | 711/114 |
| 2006/0047930 A1 | 3/2006 | Takahashi et al. | |
| 2006/0059301 A1 | 3/2006 | Sugino et al. | |
| 2006/0143418 A1 | 6/2006 | Takahashi et al. | |

* cited by examiner

*Primary Examiner*—Shane M Thomas
*Assistant Examiner*—Edward J Dudek, Jr.
(74) *Attorney, Agent, or Firm*—Brundidge & Stanger, P.C.

(57) ABSTRACT

In a computer system an object of this invention is to reduce physical resource contentions during the parallel migration of volumes. The computer system of this invention has the host computers, the storage systems and the storage management server. When parallelly migrating two or more volumes of data in the storage systems to the same number of other volumes, the storage management server selects volumes having few physical conflicts of the controllers or storage devices in the storage systems and executes the parallel migration operation.

17 Claims, 17 Drawing Sheets

FIG. 4

422 VOLUME TABLE

| VOLUME ID | MGID | STORAGE ID | VOL# | RAID LEVEL | DISK CATEGORY | RG# | DKA# | CAPA-CITY |
|---|---|---|---|---|---|---|---|---|
| 1 | 001 | 001 | 01 | RAID1 | FC | 1 | 1 | 40GB |
| 2 | 001 | 001 | 02 | RAID1 | FC | 1 | 1 | 40GB |
| 3 | 001 | 001 | 03 | RAID1 | FC | 2 | 1 | 40GB |
| 4 | 001 | 001 | 04 | RAID1 | FC | 2 | 1 | 40GB |
| 5 | 001 | 001 | 05 | RAID1 | FC | 3 | 2 | 40GB |
| 6 | 001 | 001 | 06 | RAID1 | FC | 3 | 2 | 40GB |

FIG. 5

424 STORAGE LAYER TABLE

| STORAGE LAYER ID | LAYER NAME | LAYER CONDITION | | | | |
|---|---|---|---|---|---|---|
| | | CAPACITY | DEVICE ID | DEVICE CATEGORY | RAID LEVEL | DISK CATEGORY |
| 001 | HIGHER PERFORMANCE | ≦50GB | 001 | — | RAID1 | FC |
| 002 | MEDIUM | ≦50GB | 001 | — | RAID5 | FC |
| 003 | FOR SAVE | ≦50GB | 001 | — | — | SATA |

FIG. 6

421 STORAGE TABLE

| STORAGE SYSTEM ID | STORAGE SYSTEM | DEVICE CATEGORY | NUMBER OF CONTROLLERS | PARALLEL PROCESSING NUMBER PER CONTROLLER |
|---|---|---|---|---|
| 001 | Storage-A | XXX | 4 | 2 |
| 002 | Storage-B | YYY | 2 | 2 |
| 003 | Storage-C | ZZZ | 6 | 1 |

FIG. 7

423 MIGRATION GROUP TABLE

| MGID | MIGRATION DESTINATION STORAGE LAYER | MAXIMUM PARALLEL PROCESSING NUMBER | STATE OF EXECUTION |
|---|---|---|---|
| 001 | 001 | 4 | BEING EXECUTED |
| 002 | — | — | NOT EXECUTED |
| 004 | 002 | 4 | COMPLETE |

FIG. 8

426 MIGRATION CORRESPONDENCE TABLE

| MIGRATION SOURCE | | | MIGRATION DESTINATION | | | CAPACITY |
|---|---|---|---|---|---|---|
| VOL# (911) | RG# (912) | DKA# (913) | VOL# (914) | RG# (915) | DKA# (916) | (917) |
| 1 | 1 | 1 | 21 | 4 | 1 | 40GB |
| 2 | 1 | 1 | 22 | 4 | 1 | 40GB |
| 3 | 2 | 1 | 23 | 4 | 1 | 40GB |
| 4 | 2 | 1 | 24 | 5 | 1 | 40GB |
| 5 | 3 | 2 | 42 | 6 | 2 | 40GB |
| 6 | 3 | 2 | 43 | 6 | 2 | 40GB |

FIG. 9

425 MIGRATION ORDER TABLE

| MGID (1011) | MIGRATION SOURCE VOL# (1012) | CAPACITY (1013) | PROGRESS STATE (1014) | ORDER (1015) |
|---|---|---|---|---|
| 001 | 1 | 40GB | NOT EXECUTED | 1 |
| 001 | 2 | 40GB | NOT EXECUTED | 2 |
| 001 | 3 | 40GB | NOT EXECUTED | 2 |
| 001 | 4 | 40GB | NOT EXECUTED | 1 |
| 001 | 5 | 40GB | NOT EXECUTED | 1 |
| 001 | 6 | 40GB | NOT EXECUTED | 2 |

FIG. 10

321 VOLUME TABLE

| VOL# | VDEV# | Port# | RAID LEVEL | DISK CATEGORY | RG# | DKA# | CAPACITY |
|---|---|---|---|---|---|---|---|
| 1 | 001 | 01 | RAID1 | FC | 1 | 1 | 40GB |
| 2 | 002 | 01 | RAID1 | FC | 1 | 1 | 40GB |
| 3 | 003 | 02 | RAID1 | FC | 2 | 1 | 40GB |
| 4 | 004 | 02 | RAID1 | FC | 2 | 1 | 40GB |
| 5 | 005 | 03 | RAID1 | FC | 3 | 2 | 40GB |
| 6 | 006 | 03 | RAID1 | FC | 3 | 2 | 40GB |

FIG. 18

1911 EXTERNAL VOLUME TABLE

| VOL # | EXTERNAL PORT # | IP ADDRESS | EXTERNAL VOL # |
|---|---|---|---|
| 101 | 11 | 10.209.xxx.xxx | 01 |
| 102 | 11 | 10.209.xxx.xxx | 02 |
| 104 | 12 | 200.51.xxx.yyy | 01 |

COMPUTER SYSTEM, DATA MIGRATION METHOD AND STORAGE MANAGEMENT SERVER

INCORPORATION BY REFERENCE

The present application claims priority from Japanese application JP2006-289406 filed on Oct. 25, 2006, the content of which is hereby incorporated by reference into this application.

BACKGROUND OF THE INVENTION

The present invention relates to a computer system to store a large amount of data and more particularly to a technology for migrating data.

In recent years the amount of data handled by computer systems managed by corporations, local governments, government and municipal offices and financial institutions is increasing year by year. The increase in the amount of data is currently dealt with by adding new storage systems (storage devices) or migrating data among existing storage systems.

An addition of a plurality of storage systems to a computer system as the amount of data to be managed increases results in the computer system becoming complicated in configuration. As one technology for solving this problem there is a virtualization of a computer system. The virtualization of computer system is a technology that makes a plurality of networked storage systems virtually function as if they are a logically single computer system. The virtualization of the computer system can also integrate operation managements of the networked storage systems into a single operation management, contributing to a reduced management cost.

The application of the computer system virtualization technology allows volumes of the computer system (logical or physical unit storage areas for data) to be classified into a plurality of storage layers by using characteristics such as performance and kind as conditions. For example, JP-A-2006-99748 discloses a technology that locates data in an optimum storage system according to the kind and the date of generation of the data stored in volumes. The volumes can be grouped according to the data kind and generation date so that the data can be relocated or migrated at one time.

The technology described in JP-A-2006-99748, however, does not consider an execution sequence within the group in the process of data migration. Thus, if a plurality of volumes to be migrated share the same physical resources, such as physical disks and ports, there will be conflicting accesses to one location, prolonging the migration processing.

The present invention has been accomplished to overcome the above problem and it is an object of this invention to provide a technology which, when migrating a plurality of volumes (of data: this is omitted in the explanations that follow) as one group, avoids conflicting accesses to physical resources and parallelly executes migration operations to speed up the migration of volumes.

SUMMARY OF THE INVENTION

To solve the above problem, the computer system of this invention comprises one or more host computers, a storage system to store data used by the host computers, and a storage management server, all connected through a network.

The storage system has one or more storage devices to store data used by the host computers and one or more controllers to control the storage devices. The controllers store data in volumes in the storage device, the volume being a physical or logical unit for storing data.

The storage management server has a storage unit and a processing unit. The storage unit stores physical configuration information including at least information on a physical configuration of the controllers or storage devices in the storage system; and the processing unit manages the storage devices of the storage system by volumes.

The processing unit of the storage management server, in parallelly migrating two or more volumes of data in the storage system into the equivalent number of other volumes, refers to the physical configuration information stored in the storage unit, selects volumes with few conflicting physical accesses from the controllers or storage devices in the storage system, and then parallelly executes relocation operations.

According to this invention, it is possible to avoid conflicting accesses to physical resources in the storage system and migrate (relocate) the volumes, speeding up the volume migration operation.

BRIEF DESCRIPTION OF THE DRAWINGS

FIG. 4 is an explanatory diagram showing a structure of a volume table.

FIG. 5 is an explanatory diagram showing a structure of a storage layer table.

FIG. 6 is an explanatory diagram showing a structure of a storage table.

FIG. 7 is an explanatory diagram showing a structure of a migration group table.

FIG. 8 is an explanatory diagram showing a structure of a migration correspondence table.

FIG. 9 is an explanatory diagram showing a structure of a migration order table.

FIG. 10 is an explanatory diagram showing a structure of a volume table.

FIG. 18 is an explanatory diagram showing a structure of an external volume table.

DESCRIPTION OF THE EMBODIMENTS

Now, embodiments of the present invention will be described by referring to the accompanying drawings. It is noted that the embodiments described below are not intended in any way to limit the scope of claims of the invention and that not all of the features explained in the embodiments are essential to the accomplishment of the invention.

First Embodiment

Figure 1:
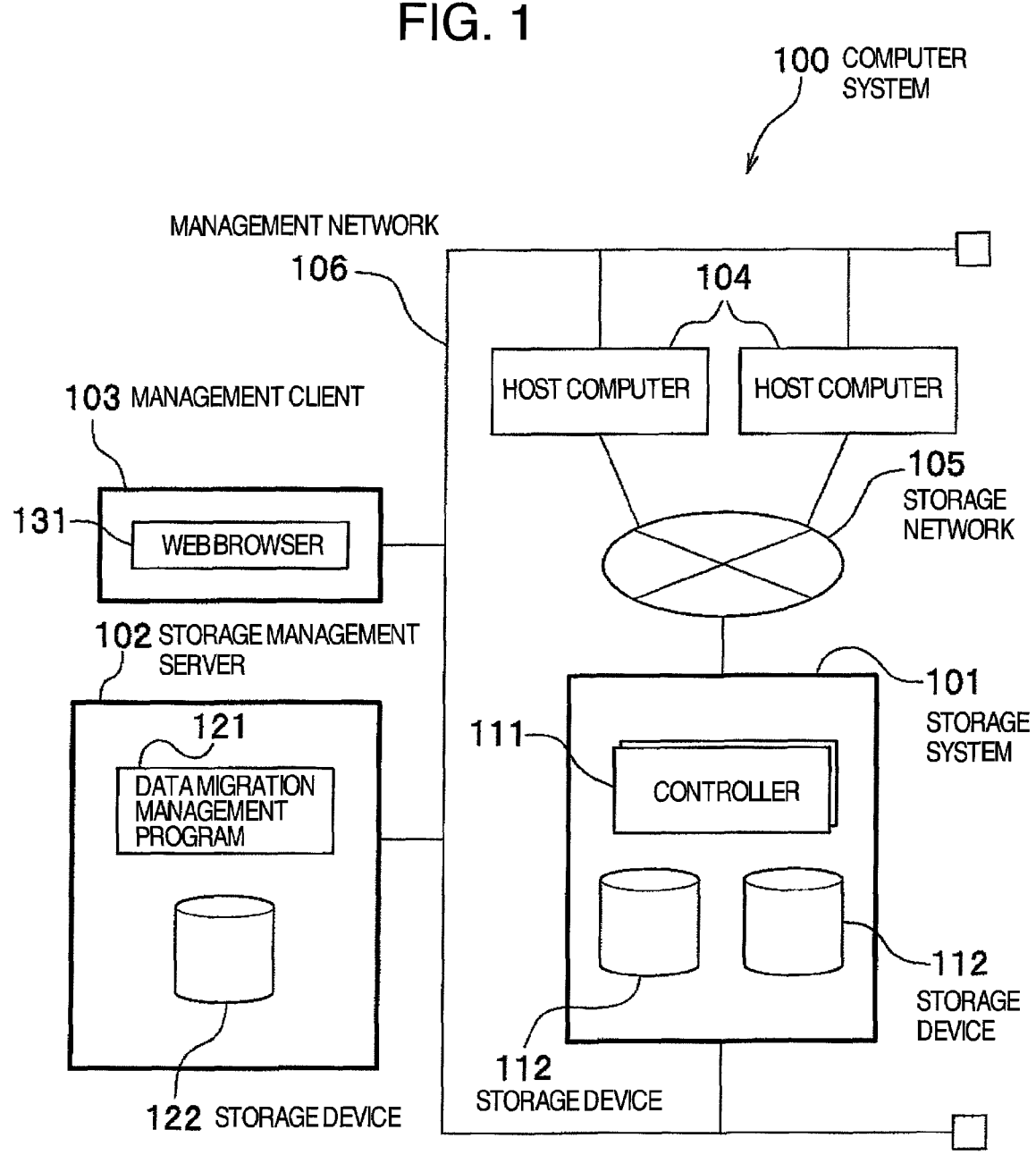
FIG. 1 is a hardware configuration diagram of a computer system according to a first embodiment of this invention.
Figure 2:
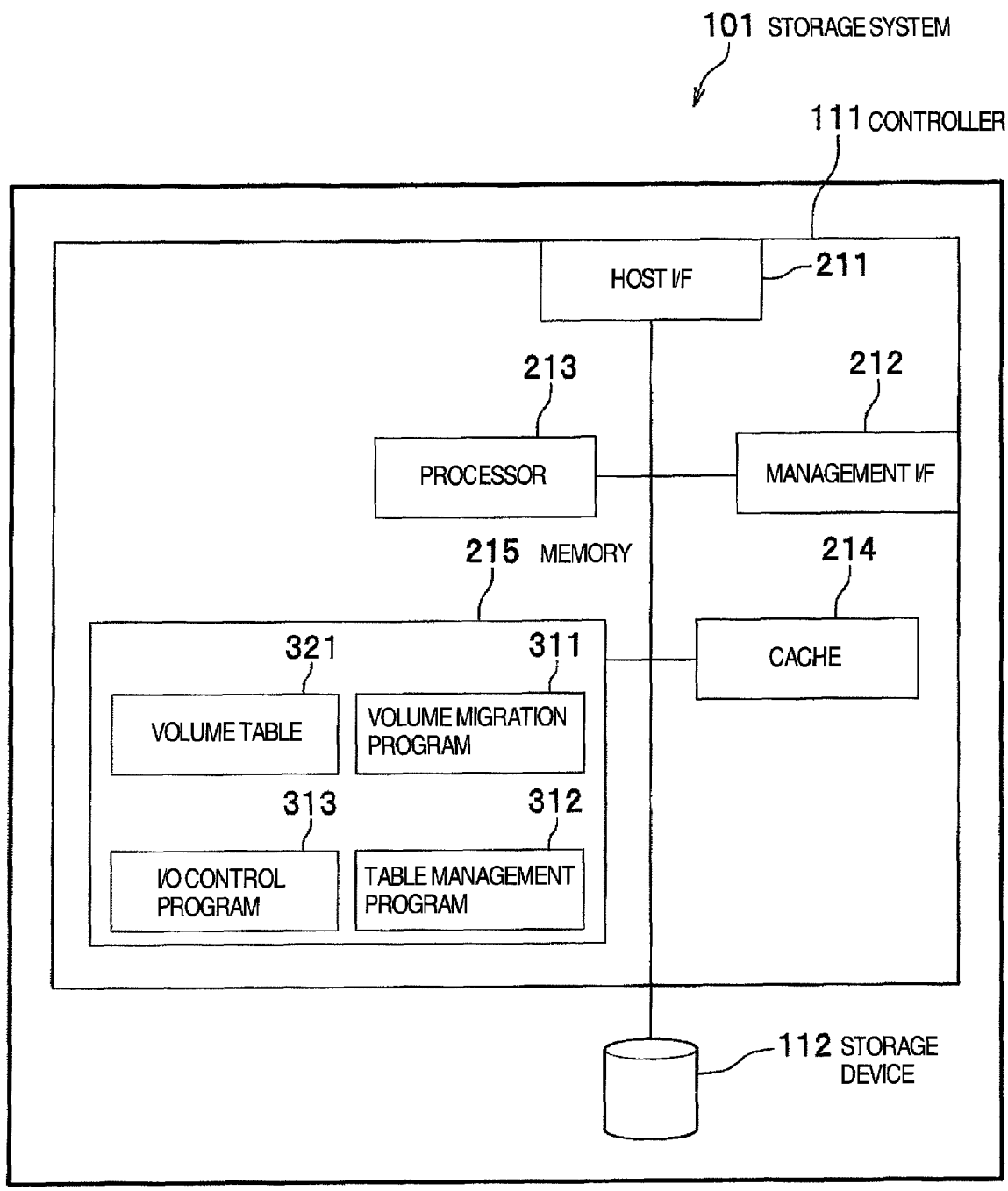
FIG. 2 is a configuration diagram of a storage system.
Figure 3:
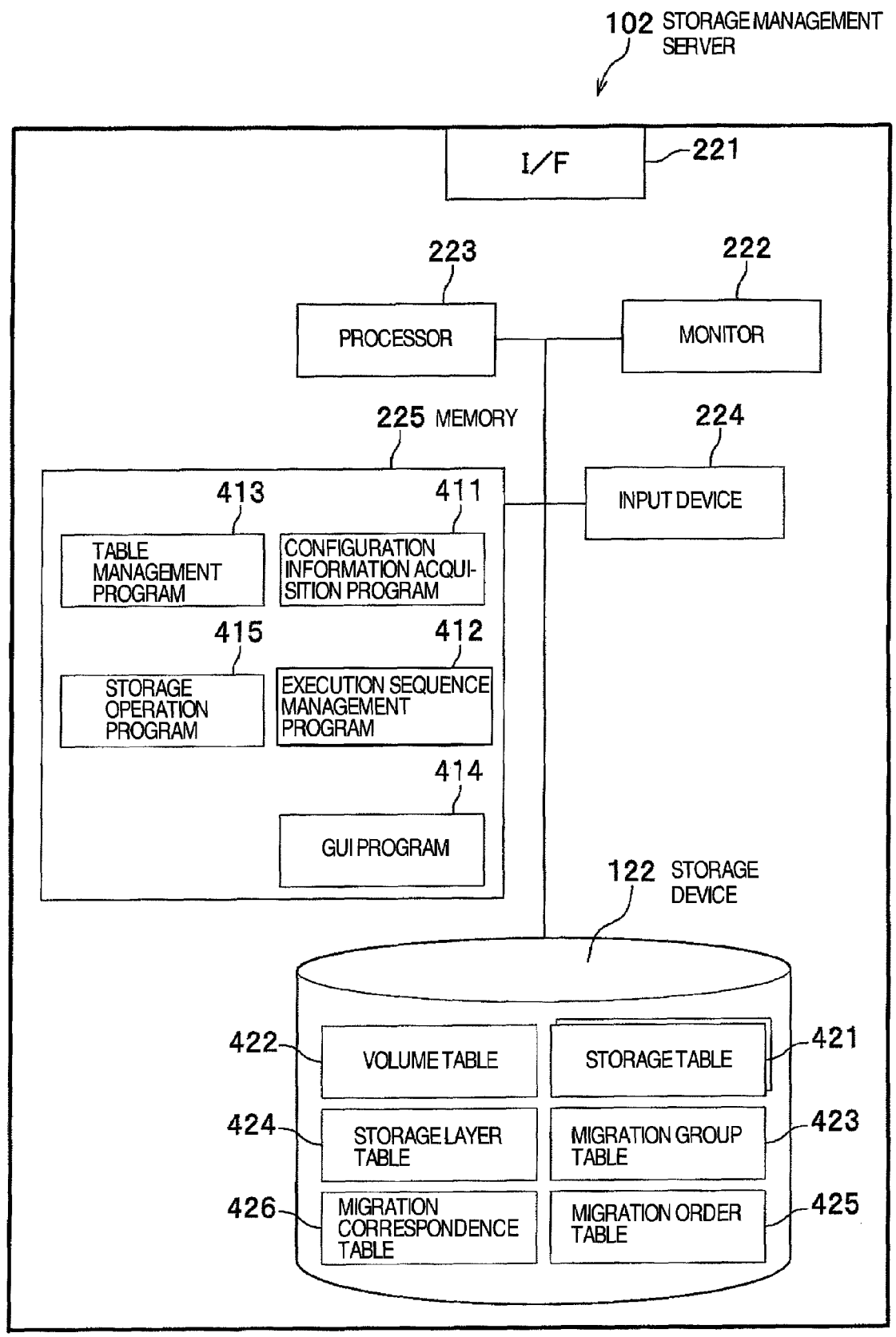
FIG. 3 is a configuration diagram of a storage management server.

Referring to FIG. 1 through FIG. 3, detailed explanations will be given to the configuration of a computer system 100 according to the first embodiment.

FIG. 1 shows a hardware configuration of the computer system 100. The computer system 100 has a storage system 101, a storage management server 102, a management client 103, one or more host computers 104, a storage network 105 and a management network 106.

The host computer 104 may, for example, be a workstation system, a mainframe computer or a personal computer. The host computer 104 uses storage resources provided by the storage system 101 to execute a variety of jobs (e.g., database operations, Web application operations and streaming operations).

The storage network 105 interconnects one or more host computers 104 and the storage system 101. The storage network 105 may, for example, be a SAN (Storage Area Network), a LAN (Local Area Network), a WAN (Wide Area Network), the Internet, dedicated circuits and public telephone circuits.

The storage system 101 has one or more controllers 111 and a plurality of storage devices 112.

The controller 111 can control these storage devices 112 in one of RAID (Redundant Arrays of Inexpensive Disks) levels (e.g., 0, 1, 5) defined by the RAID system. In the RAID system, a plurality of storage devices 112 are managed as one RAID group. The RAID group may consist of four storage devices 112, which may be used in a (3D+1P) configuration (i.e., three storage devices are used for storing normal data and the remaining storage device for storing parity data). Or the RAID group may consist of eight storage devices 112, which may be used in a (7D+1P) configuration. In other words, a plurality of storage areas provided by these storage devices 112 combine to form one RAID group. On each RAID group are defined one or more logical volumes, units for access from the host computer 104 (details will be described later by referring to FIG. 15).

In this embodiment, one RAID group may be controlled by one controller 111. That is, the I/O control on a particular RAID group may be done by the controller which controls that RAID group. It is also possible to control one RAID group by a plurality of controllers 111.

The storage devices 112 may be physical devices, such as FC (Fiber Channel) disk drives, SATA (Serial Advanced Technology Attachment) disk drives, PATA (Parallel Advanced Technology Attachment) disk drives, FATA (Fiber Attached Technology Adapted) disk drives, SAS (Serial Attached SCSI) disk drives and SCSI (Small Computer System Interface) disk drives. The physical device means a real device having a physical storage area. The storage devices 112 may also use semiconductor memories such as flash memories in combination.

The management network 106 interconnects one or more host computers 104, a storage system 101, a storage management server 102 and a management client 103 and is used for the transfer of management information among them.

The management client 103 is a computer to maintain and manage the computer system 100. The user can maintain and manage the computer system 100 by entering a storage management command through a Web browser 131 installed in the management client 103. The storage management command may include, for example, one for adding and eliminating storage devices 112 or for specifying a change in the RAID configuration and one for setting a communication path between the host computer 104 and the storage system 101.

The storage management server 102 maintains and manages the computer system 100 by receiving a variety of storage management commands from the management client 103. The storage management server 102 has a data migration management program 121. The data migration management program 121 executes operations for relocating volumes among the storage layers. The data migration management program 121 refers to data relocation programs in general and will be detailed later (FIG. 3).

The storage management server 102 has a storage device 122 to store information on the configuration of the computer system 100.

FIG. 2 shows a configuration of the storage system 101 (refer to FIG. 1 as required). The controller 111 has a host interface (I/F) 211, a management interface (I/F) 212, a processor 213, a cache 214 and a memory 215.

The host interface 211 is a network interface that allows the storage system 101 to connect to the host computer 104 through the storage network 105.

The management interface 212 is a network interface that allows the storage system 101 to connect to the storage management server 102 and the management client 103 through the management network 106.

The processor 213 controls a data input/output to and from the storage devices 112 in response to a data input/output command from the host computer 104, and may be implemented, for example, by a CPU (Central Processing Unit).

The cache 214 temporarily saves data to be transferred to and from the storage devices 112.

The memory 215 stores microprograms for a variety of controls. The micrograms stored in the memory 215 include a volume migration program 311, a table management program 312, an I/O control program 313.and a volume table 321.

The volume migration program 311 is a program to change a relationship between volumes and the storage devices 112. The host computer 104 identifies volumes by their IDs (IDentifications) and recognizes the locations of logical storage areas (logical addresses) on the volumes that data are to be written into or read from but does not recognize the locations of physical storage areas on the storage devices 112. The volume migration is a function to change the locations of logical storage areas on the volumes that the host computer 104 recognizes. The volume migration program 311 can migrate volumes belonging to a particular storage layer (described later in connection with FIG. 5) to other storage layers.

The table management program 312 is a program to read and write information held in the volume table 321.

The I/O control program 313 is a program to control a data input/output to and from the storage devices 112 in response to an I/O command from the host computer 104.

The volume table 321 holds information on the relation between the volumes and the storage devices 112 and information on volume characteristics. Details of the volume table will be explained later (FIG. 10).

FIG. 3 shows a configuration of the storage management server 102 (see FIG. 1 as required). The storage management server 102 has an interface (I/F) 221, a monitor 222, a processor 223, an input device 224, a memory 225 and a storage device 122.

The interface 221 may be a LAN adapter for connection with the management network 106. The interface 221 acquires volume configuration information on the storage devices 112 from the storage system 101 and sends a volume migration command to the storage system 101.

The monitor 222 is a display to offer a storage management screen under a GUI (Graphical User Interface) environment to the user. The input device 224 may be a keyboard or mouse to enter a storage management command. The monitor 222 and the input device 224 are not necessarily essential devices.

The processor 223 maintains and manages the computer system 100 according to the program stored in the memory 225 and also executes a migration operation on the volume between storage layers based on the data migration management program 121. In flow charts of FIG. 11 to FIG. 14, when a computer program is a subject of sentences, it is noted that the processing of interest is actually performed by the processor 223 that executes the associated computer program.

The data migration management program 121 stored in the memory 225 includes a configuration information acquisition program 411, an execution sequence management program 412, a table management program 413, a GUI program 414 and a storage operation program 415.

Stored in the storage device 122 are a storage table 421 (physical configuration information), a volume table 422 (physical configuration information), a migration group table 423 (migration group information), a storage layer table 424, a migration order table 425 and a migration correspondence table 426 (physical configuration information) (details on these information will be described later with reference to FIG. 4 to FIG. 9).

FIG. 4 shows a structure of the volume table 422 (see also other associated figures). The volume table 422 holds information on the volumes provided by the storage system 101. The volume table 422 associates a volume ID 511, an MG ID 512, a storage ID 513, a VOL# 514, a RAID level 515, a disk category 516, an RG# 517, a DKA# 518 and a capacity 519 to each volume.

The volume ID 511 is an ID by which the host computer 104 identifies the volume in the storage system 101.

The MG ID 512 refers to an ID that identifies a migration group, a unit group of volumes that are migrated in one operation.

The storage ID 513 is an ID to identify the storage system 101.

The VOL# 514 is a number to identify a volume in the storage system 101.

The RAID level 515 represents a RAID level of a volume.

The disk category 516 represents a disk category of the storage device 112 that provides volume storage areas (e.g., information to distinguish between an FC disk and a SATA disk). If the disk category is "FC", for example, it indicates that the storage device is an FC disk. If the disk category "SATA", the disk device is a SATA disk.

The RG# 517 indicates a number identifying a RAID group to which the volume belongs.

The DKA# 518 represents a number identifying a controller that controls the RAID group to which the volume belongs. If the maximum processing number depends only on the RAID groups (as when there is only one controller or when all the controllers can control all volumes as by switching), there is no need to consider the controllers. In that case, the DKA# 518 is not essential.

The capacity 519 represents a storage capacity of the volume.

FIG. 5 shows a structure of the storage layer table 424 (also see other pertinent figures). The storage layer table 424 holds information about the storage layers. The storage layer table 424 associates a storage layer ID 611, a layer name 612 and a layer condition 613 to each storage layer.

The storage layer ID 611 is an ID to identify the storage layer.

The layer name 612 represents a name of the storage layer.

The layer condition 613 is a condition defining the storage layer. The layer condition 613 may include, for example, a "capacity", a "(storage) device ID", a "(storage) device category", a "RAID level" and a "disk category", from which one or more combinations can be selected. Items that are not specified with the layer condition are marked with "--".

The "capacity" represents a storage capacity of the storage layer. The "device ID" is an ID to identify the storage system 101. The "device category" indicates a category of the storage system 101 (e.g., type number of the device). The "RAID level" indicates a RAID level of the storage layer. The "disk category" represents a disk category of the storage device 112 that provides the storage area for the storage layer. When the disk category is "FC", the storage device is a FC disk. When the disk category is "SATA", it is a SATA disk.

FIG. 6 shows a structure of the storage table 421 (see also other pertinent figures). The storage table 421 holds information about the storage system 101. The storage table 421 associates a storage system ID 711, a storage name 712, a device category 713, a controller number 714 and a parallel processing number 715 per controller to each storage system 101.

The storage system ID 711 is an ID to identify the storage system 101.

The storage name 712 indicates a name of the storage system.

The device category 713 represents a category of the storage system 101 (e.g., a type number of the device).

The controller number 714 represents the total number of controllers 111 installed in the storage system 101.

The parallel processing number 715 per controller represents the number of volumes that the controller 111 of the storage system 101 can parallelly process for volume migration. In this embodiment, the controller 111 can speed up the migration process by parallelly performing the migration operations on a plurality (e.g., two) of volumes. That is, when the volumes belonging to one controller 111 belongs to different RAID groups, the controller 111 can execute the migration of these volumes parallelly (each controller can process up to 715 volumes parallelly). The parallel processing number 715 for each controller depends on the performance of the controller 111. Items that are not specified with the parallel processing number are marked with "--".

FIG. 7 shows a structure of the migration group table 423 (see also other pertinent figures). The migration group table 423 holds information about the migration group. The migration group refers to a group of volumes that are migrated in one operation. In performing the volume migration in one operation, the administrator generates a migration group and registers it with the migration group table 423. Then, the volumes to be migrated (referred to as migration source volumes) are added to the migration group. Next, a storage layer to which the volumes are to be migrated is selected for the migration group. Next, volumes belonging to the storage layer are selected as destination volumes to which the migration source volumes are to be migrated (hereinafter referred to as migration destination volumes). With the above operation, the volume migration is instructed.

The migration group table associates an MG ID 811, a migration destination storage layer 812, a maximum parallel processing number 813 and a processing state 814 to each migration group.

The MG ID 811 is an ID to identify the migration group.

The migration destination storage layer 812 represents information about an ID of the storage layer to which the volumes belonging to the migration group are to be migrated. Marking "--" in the migration destination storage layer 812 indicates that the migration destination storage layer is not specified.

The maximum parallel processing number 813 represents the maximum number of volumes within the migration group that can be parallelly migrated. Marking "--" in the maximum parallel processing number 813 represents a case where the maximum parallel processing number cannot be calculated, as when the migration destination storage layer is not specified.

The processing state 814 is information indicating whether the migration group is being migrated or not. The processing state 814 includes states "being processed", "unprocessed", "completed" and "failed". The "being processed" state indicates that the volumes in the migration group are being migrated. The "unprocessed" state indicates that the migration operation on the migration group of interest has not been performed at all. The "completed" state indicates that the migration to the migration destination storage layer 812 is complete. The "failed" state indicates that the migration of the migration group failed.

FIG. 8 shows a structure of the migration correspondence table 426 (see also other pertinent figures). The migration correspondence table 426 shows the correspondence between the migration source volumes and the migration destination volumes.

The migration correspondence table associates to each volume correspondence a migration source VOL# 911, a migration source RG# 912 and a migration source DKA# 913 of the migration source volumes, a migration destination VOL# 914, a migration destination RG# 915 and a migration destination DKA# 916 of the migration destination volumes, and a capacity 917.

The migration source VOL# 911, migration source RG# 912 and migration source DKA# 913 of the migration source volumes correspond to the VOL# 514, RG# 517 and DKA# 518 in the volume table 422, respectively.

The migration destination VOL# 914, migration destination RG# 915 and migration destination DKA# 916 of the migration destination volumes correspond to the VOL# 514, RG# 517 and DKA# 518 in the volume table 422, respectively.

The migration source DKA# 913 and the migration destination DKA# 916 are deleted from the migration correspondence table when DKA# 518 does not exist in FIG. 4.

The capacity 917 represents the capacity of the destination source volumes.

FIG. 9 shows a structure of the migration order table 425 (see also other pertinent figures). The migration order table 425 holds information about the order in which volumes are parallelly processed for volume migration. The migration order table 425 associates an MG ID 1011, a migration source VOL# 1012, a capacity 1013, a progress state 1014 and a migration order 1015 to each volume in the migration group.

The MG ID 1011 is an ID to identify the migration group.

The migration source VOL# 1012 is a number to identify a migration source volume. The migration source VOL# 1012 corresponds to the migration source VOL# 911 in the migration correspondence table 426.

The capacity 1013 represents a capacity of the volume.

The progress state 1014 indicates a state of execution of the volume migration, which includes "unprocessed", "being processed" and "completed" state. The "unprocessed" state indicates that the migration of the volume is not yet executed. The "being processed" state indicates that the volume migration is being executed. The "completed" state indicates that the volume migration is finished.

Figure 14:
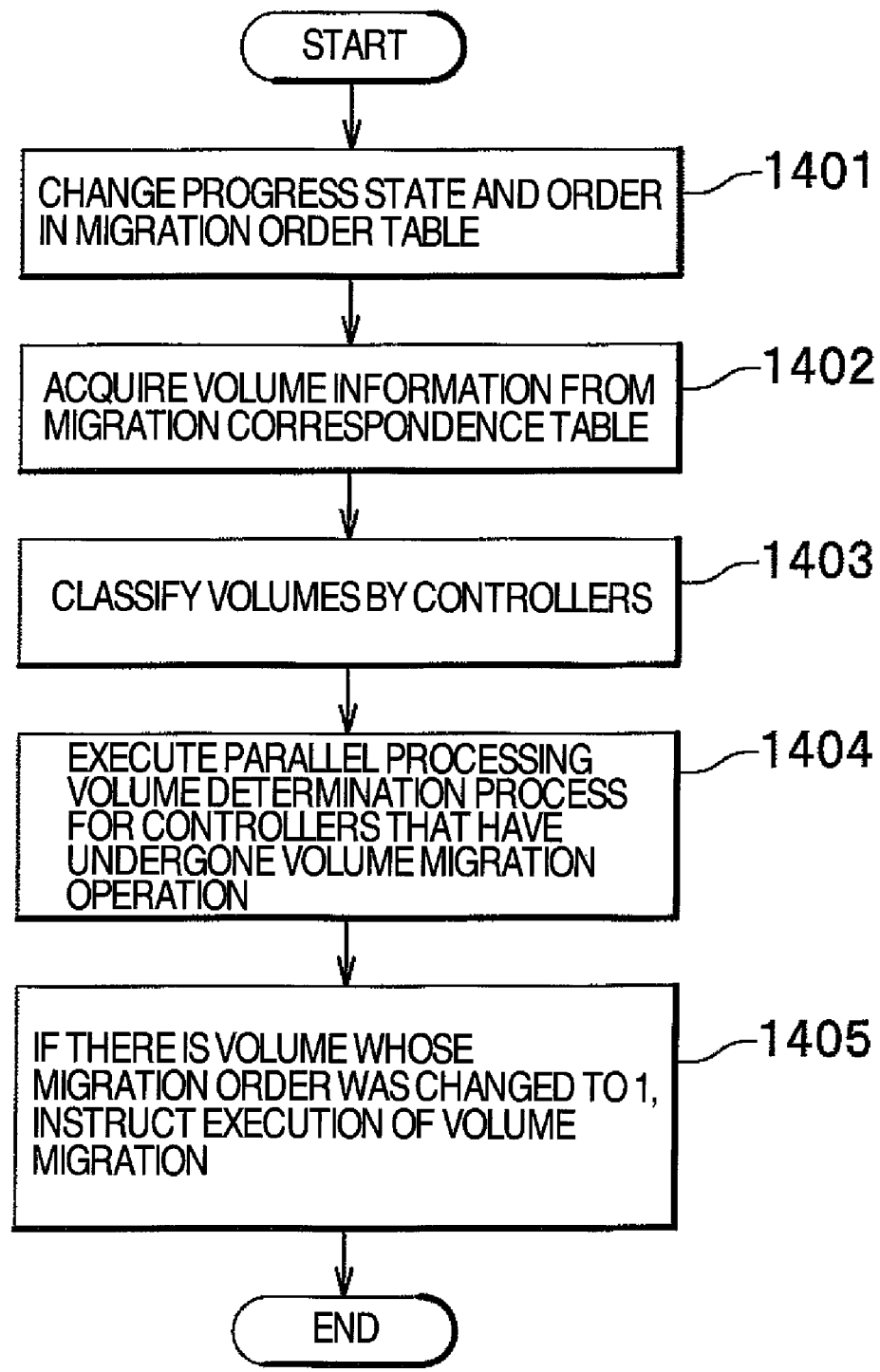
FIG. 14 is a flow chart showing a sequence of steps performed to select volumes that have not yet undergone a volume migration operation and to instruct the volume migration operation.

The migration order 1015 represents an order in which the volume migrations are parallelly processed. The migration order 1015 includes, for example, "0", "1" and "2". "0" represents a volume that is being migrated or its migration completed. "1" represents a volume that is to be migrated next. "2" represents a volume that has not yet entered the volume migration process. In the migration order 1015, a volume assigned with "2" is changed to "1" if the parallel migration of the volume is possible when the migration process on a volume currently being migrated is finished. And the migration process on that volume is initiated. The flow of this processing will be explained later (FIG. 14).

FIG. 10 shows a data structure of the volume table 321 (see also other pertinent figures). The volume table 321 holds information necessary for the controller 111 to read and write data to and from volumes. The volume table associates VOL# 1111, VDEV# 1112, Port# 1113, RAID level 1114, disk category 1115, RG# 1116, DKA# 1117 and capacity 1118 to each volume.

The VOL# 1111 represents a number identifying a volume in the storage system 101.

The VDEV# 1112 represents a number identifying a virtual device allotted to a storage area on the volume.

The Port# 1113 represents a number identifying a port allotted to the volume.

The RAID level 1114 represents a RAID level of a storage area on the volume. The RAID level 1114 may include a drive configuration of the storage devices 112.

The disk category 1115 represents a disk category of the storage devices 112 that provide storage areas on the volume.

The RG# 1116 represents a number identifying a RAID group to which the volume belongs.

The DKA# 1117 represents a number identifying a controller that controls the RAID group to which the volume belongs.

The capacity 1118 represents a storage capacity of the volume.

Figure 11:
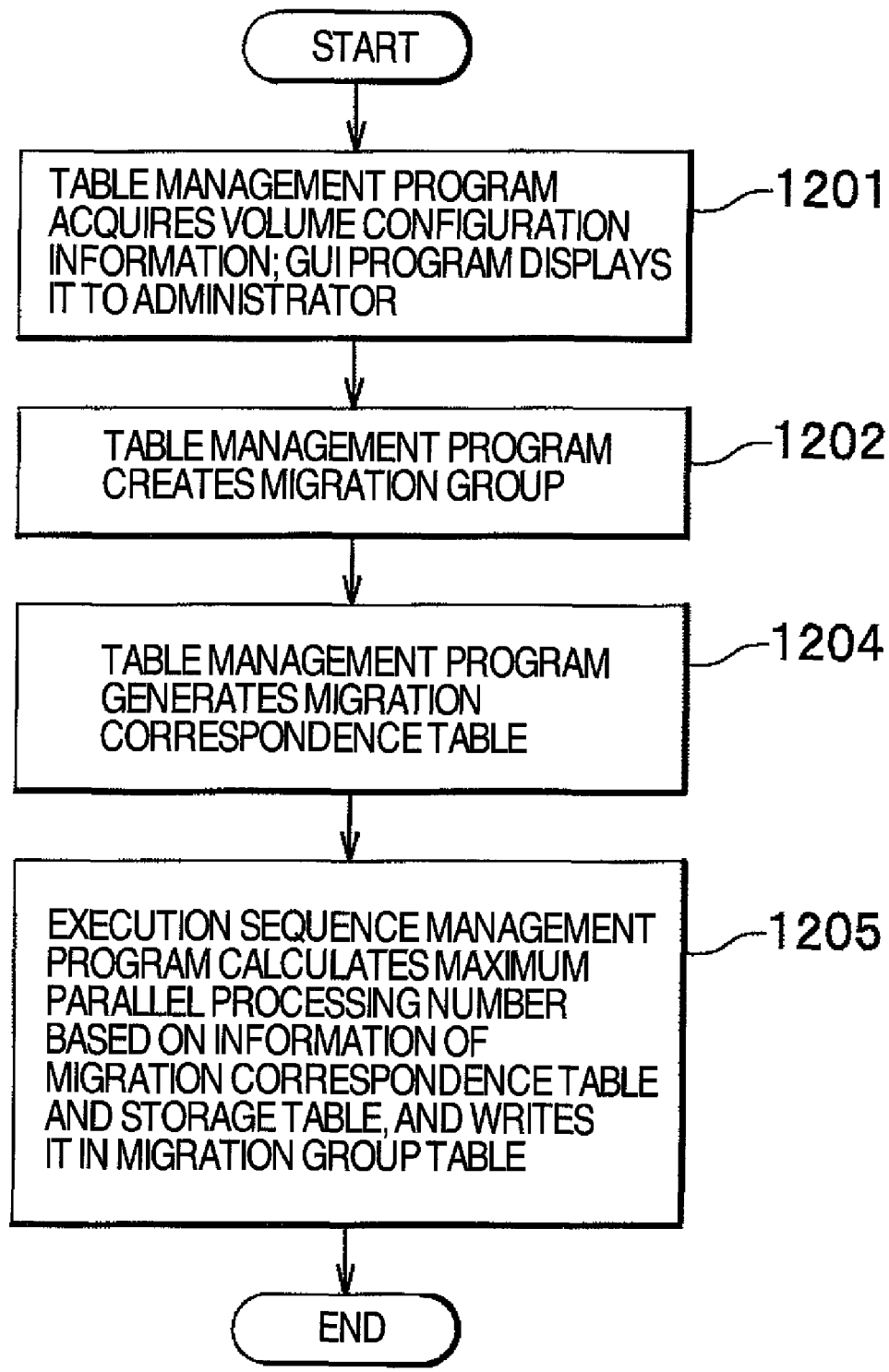
FIG. 11 is a flow chart showing a sequence of steps performed to determine, from a migration group set by an administrator, a maximum parallel processing number during a data migration.

FIG. 11 is a flow chart showing a process performed by the storage management server 102 that determines (calculates) the maximum parallel processing number during the data migration operation from the migration group set by the administrator.

First, the table management program 413 acquires a volume configuration information from the volume table 422. The GUI program 414 displays the volume configuration information acquired from the volume table 422 to the administrator through the Web browser 131 of the management client 103 (step 1201).

Next, the administrator generates a migration group on the screen displayed by the GUI program 414 based on the information displayed by step 1201. The generation of the migration group is done in the following two steps. First, a migration group ID is set. Then, migration source volumes are added to the migration group.

As a result, the table management program 413 adds information on the new migration group to the migration group table 423 and changes the MGIDs of the added volumes in the volume table 422 to the ID of the migration group to which the source volumes were added (step 1202).

Further, on the screen (not shown), the administrator selects destination volumes for the source volumes added to the migration group. Rather than the administrator selecting the destination volumes, the execution sequence management program 412 may select the destination volumes from the destination storage layer according to a policy (condition) determined in advance by the administrator.

The table management program 413 generates a migration correspondence table 426 from the information of the volume table 422 and the information of the selected volumes (step 1204).

The execution sequence management program 412 determines the maximum parallel processing number for the volume migration based on the information of the migration correspondence table 426 and the storage table 421 and writes it into the migration group table 423 (step 1205). The method for determining the maximum parallel processing number will be explained by referring to FIG. 15.

Figure 15:
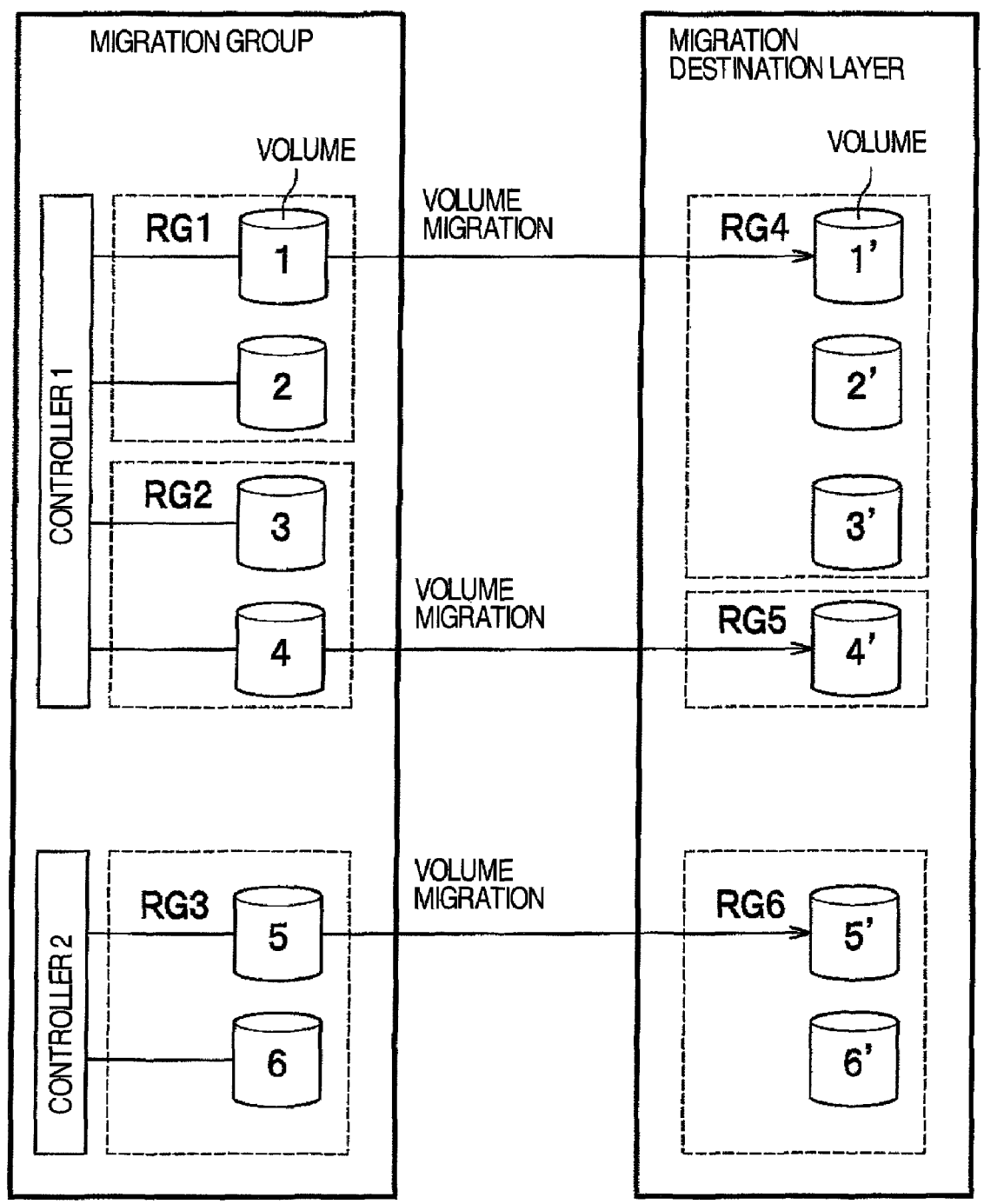
FIG. 15 is a conceptual diagram showing a volume migration parallel execution operation.

FIG. 15 shows a concept of the parallel processing of the volume migration (see also other pertinent figures).

The maximum parallel processing number is determined by the RAID group (in this embodiment, RG "1" to "3") to which the volumes added to the migration group (in this embodiment, volume "1" to "6") belong and the controller (corresponding to controller 111: in this case, controller "1" and "2"). Here it is assumed that each controller can execute the migration of up to two different volumes in the RAID group. As to the migration group shown in FIG. 15, of the volumes "1" to "4" belonging to the controller "1", volumes "1" and "2" belong to RG "1" and volumes "3" and "4" belong to RG "2". Thus, the number of volumes that can be parallelly executed by the controller "1" is two. The volumes "5" and "6" belonging to the controller "2" both belong to RG "3". Thus, the controller "2" has the parallel processing number of 1. Therefore, the migration group of FIG. 15 has the parallel processing number of 3.

If the maximum parallel processing number depends only on the RAID groups, the maximum parallel processing number is determined for each RAID group. The maximum parallel processing number is a product of the number of RAID groups to which the volumes added to the migration group belong (in this case, 3) and the maximum parallel processing number for each RAID group (e.g., 1), (product in this case: 3×1=3).

Figure 12:
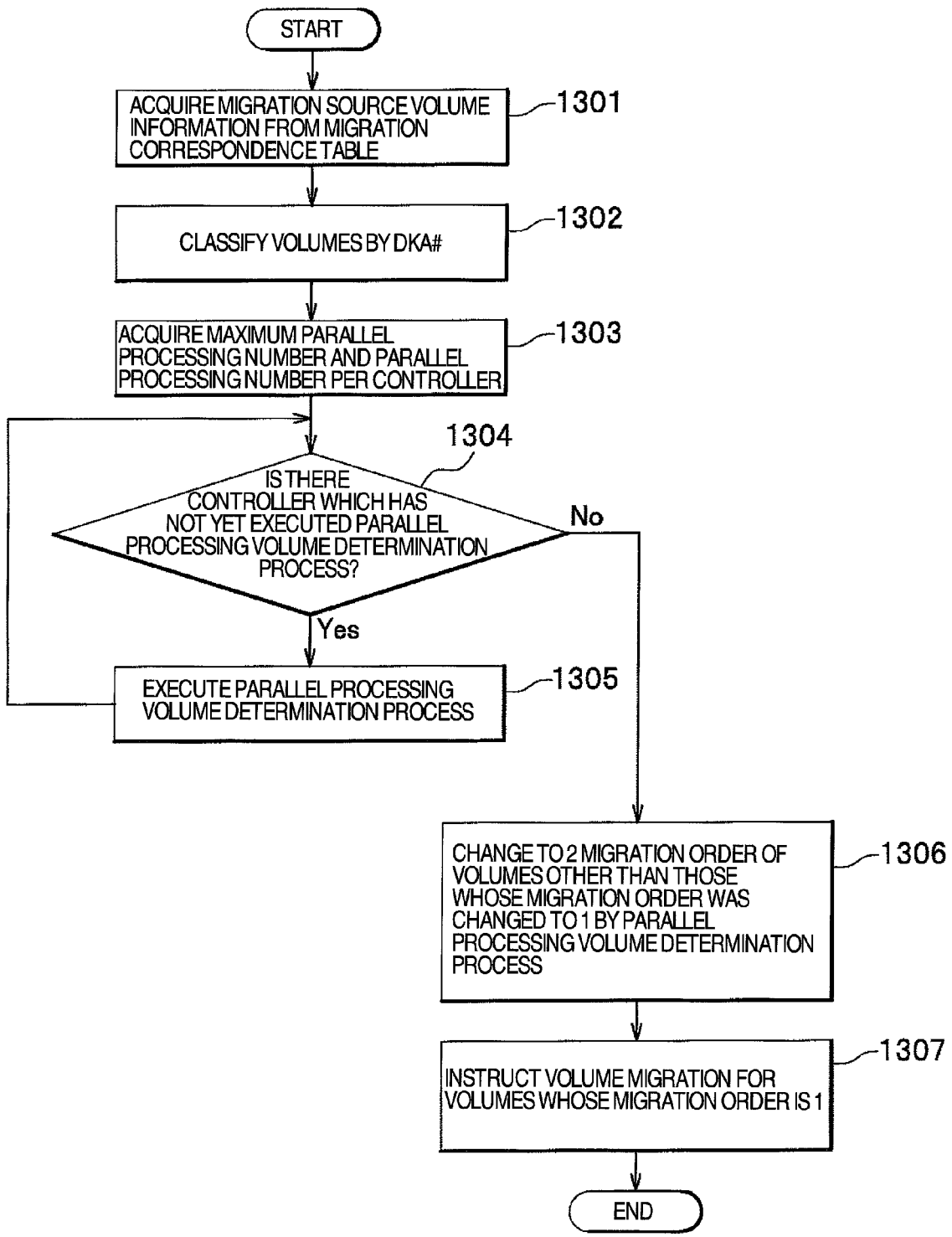
FIG. 12 is a flow chart showing a sequence of steps performed to select, at the start of a volume migration operation, volumes that are to be parallelly processed.

FIG. 12 is a flow chart showing a sequence of steps performed by the storage management server 102 in selecting volumes to be parallelly processed at the start of the volume migration operation (see also other pertinent figures). The volume migration operation is started by the administrator or storage management server 102.

First, the table management program 413 acquires from the migration correspondence table 426 information on the source volumes belonging to the migration group that will undergo the volume migration operation (step 1301).

Next, the table management program 413 classifies each volumes by DKA# 913 from the volume information acquired in step 1301 (step 1302).

Next, the table management program 413 acquires the maximum parallel processing number 813 and the parallel processing number 715 per controller from the migration group table 423 and the storage table 421 (step 1303). If the maximum parallel processing number depends only on the RAID groups (i.e., it does not depend on the controllers 111), the step 1304 is omitted and the step 1305 is executed, after which step 1306 is executed.

Next, the execution sequence management program 412 checks, for the controllers classified by step 1302, if there is any controller that is not executing the parallel processing volume determination process (a process for evaluating physical contentions and determining volumes to be parallelly processed) (step 1304). The parallel processing volume determination process is a process to determine which of the volumes belonging to each controller should be parallelly processed. This process will be explained by referring to FIG. 13.

If a controller exists which is not executing the parallel processing volume determination process (step 1304, Yes), the parallel processing volume determination process is initiated (step 1305).

If there is no controller that is not executing the parallel processing volume determination process (step 1304, No), the table management program 413 changes to 2 the migration order of other than the volumes whose migration orders were changed to 1 by the parallel processing volume determination process, thus rewriting the migration order table 425 (step 1306).

The storage operation program 415 instructs the storage system 101 to migrate the volumes whose migration order in the migration order table 425 is 1 (step 1307).

Figure 13:
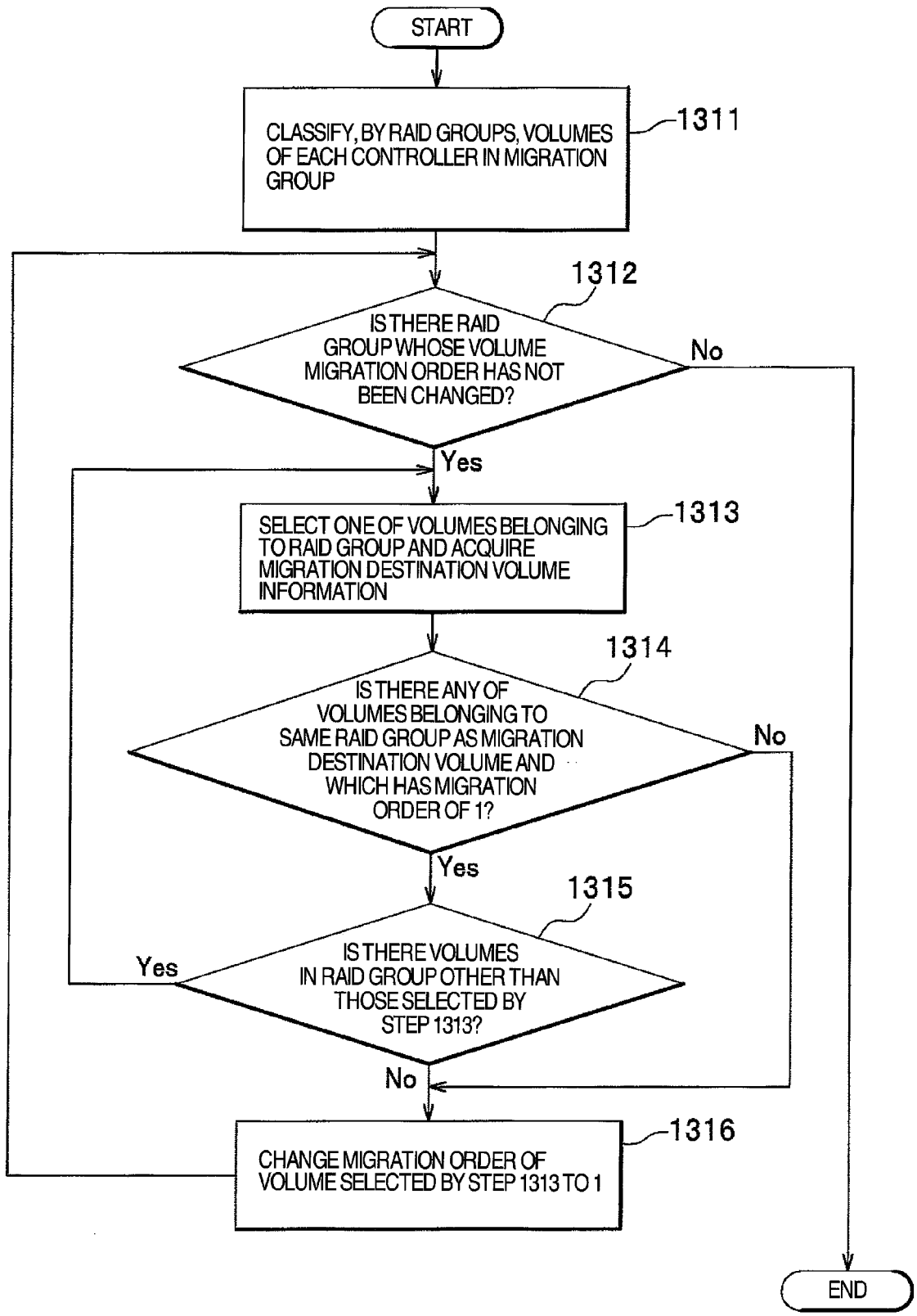
FIG. 13 is a flow chart showing a sequence of steps for a parallel processing determination process.

FIG. 13 is a flow chart for the parallel processing determination process (content of step 1305 in FIG. 12). This processing is executed for each controller.

First, according to the volume table 422, the table management program 413 classifies the volumes in the migration group that belong to the controller of interest into individual RAID groups (step 1311).

Next, as for the RAID groups into which the volumes were classified, the execution sequence management program 412 checks if there is any RAID group in which the volume migration order has not been changed at all (step 1312). If there is no RAID group whose migration order has not been changed (step 1312, No), this means that the migration order has been changed for all RAID groups. Therefore, the processing is ended.

If there is a RAID group whose migration order has not been changed (step 1312, Yes), the execution sequence management program 412 selects one of the volumes belonging to the RAID group and acquires information of the migration destination volume from the migration order table 425 (step 1313). In this embodiment, the volume selection is made in the order of VOL#. The order of volume selection may be determined by other method.

It is then checked whether, among the migration destination volumes belonging to the same RAID group as a migration destination volume acquired by step 1313, there is any which has a migration order of 1 (step 1314).

If, among migration destination volumes belonging to the same RAID group as the acquired migration destination volume, there is a volume whose migration order is 1 (step 1314, Yes), the execution sequence management program 412 then checks if this RAID group has other than the volume of interest and the volume already selected by step 1313 (step 1315).

If the RAID group of interest has other than the volume of interest and the volume already selected by step 1313 (step 1315, Yes), it selects another volume and executes the step 1313.

If, of the migration destination volumes belonging to the same RAID group as the acquired migration destination volume, no volume exists whose migration order is 1 (step 1314, No), or if the RAID group of interest has the volume of interest (step 1314, Yes) but does not have volumes other than those already selected by step 1313 (step 1315, No), the execution sequence management program 412 changes the migration order of the volume of interest to 1 (step 1316).

How the order of the parallel processing in the volume migration is determined will be explained by taking FIG. 15 for example. The execution sequence management program 412 selects volumes to be migrated for each of the RAID groups belonging to each controller. Here, a migration order for a volume "1" from RG "1" and a volume "1'" is changed to 1. Next, the execution sequence management program 412 selects a volume "3" from RG "2" in step 1313 of FIG. 13. But because a migration destination volume "3'" for the volume "3" belongs to RG "4" and the volume "1'" belonging to the same RG "4" already has the migration order of 1, the volume "3" cannot be selected. Next, a volume "4" is selected in step 1313. A migration destination volume "4'" for the volume "4" belongs to RG "5" and there is no volume in RG "5" whose migration order is 1. So the volume "4" can be selected.

FIG. 14 is a flow chart showing a sequence of steps performed after a volume has been migrated, to instruct another volume migration by selecting one of unprocessed volumes in the migration group.

The storage management server knows the completion of volume migration by the following two methods—one by which the storage operation program 415 periodically checks the storage system to see if the volume migration is complete and one by which the storage system 101 notifies the storage management server 102 when the volume migration is finished. The storage management server 102 may recognize the completion of the volume migration by another method.

When the volume migration is complete, the table management program 413 changes the progress state 1014 and the migration order 1015 in the migration order table 425 (step 1401).

Next, the table management program 413 acquires information on each volume from the migration correspondence table 426 and the migration order table 425 (step 1402) and classifies them by the controller (step 1403).

The execution sequence management program 412 performs the intra-controller parallel processing volume determination process, which was explained in connection with FIG. 13, on the controller to which the migration-completed volume belongs (step 1404).

In step 1404, if there is a volume whose migration order was changed to 1 by the execution sequence management program 412, the storage operation program 415 instructs the execution of a migration of the volume of interest (step 1405).

According to the computer system 100 of this embodiment, as described above, a plurality of volumes can be parallelly migrated (relocated) by selecting volumes whose physical resources do not conflict (or have few conflicts) in the storage system 101.

Further, by determining the maximum parallel processing number of volumes whose physical resources do not conflict (or conflict less than a predetermined level) in the storage system 101, the efficiency of the volume migration can be maximized.

Second Embodiment

A second embodiment is a construction in which the present invention is applied to the computer system that integrally manages a plurality of storage systems 101 by using a computer system virtualization technology. Those parts in this embodiment identical with the corresponding parts in the first embodiment are given like reference numbers and their duplicating explanations are omitted as appropriate.

Figure 16:
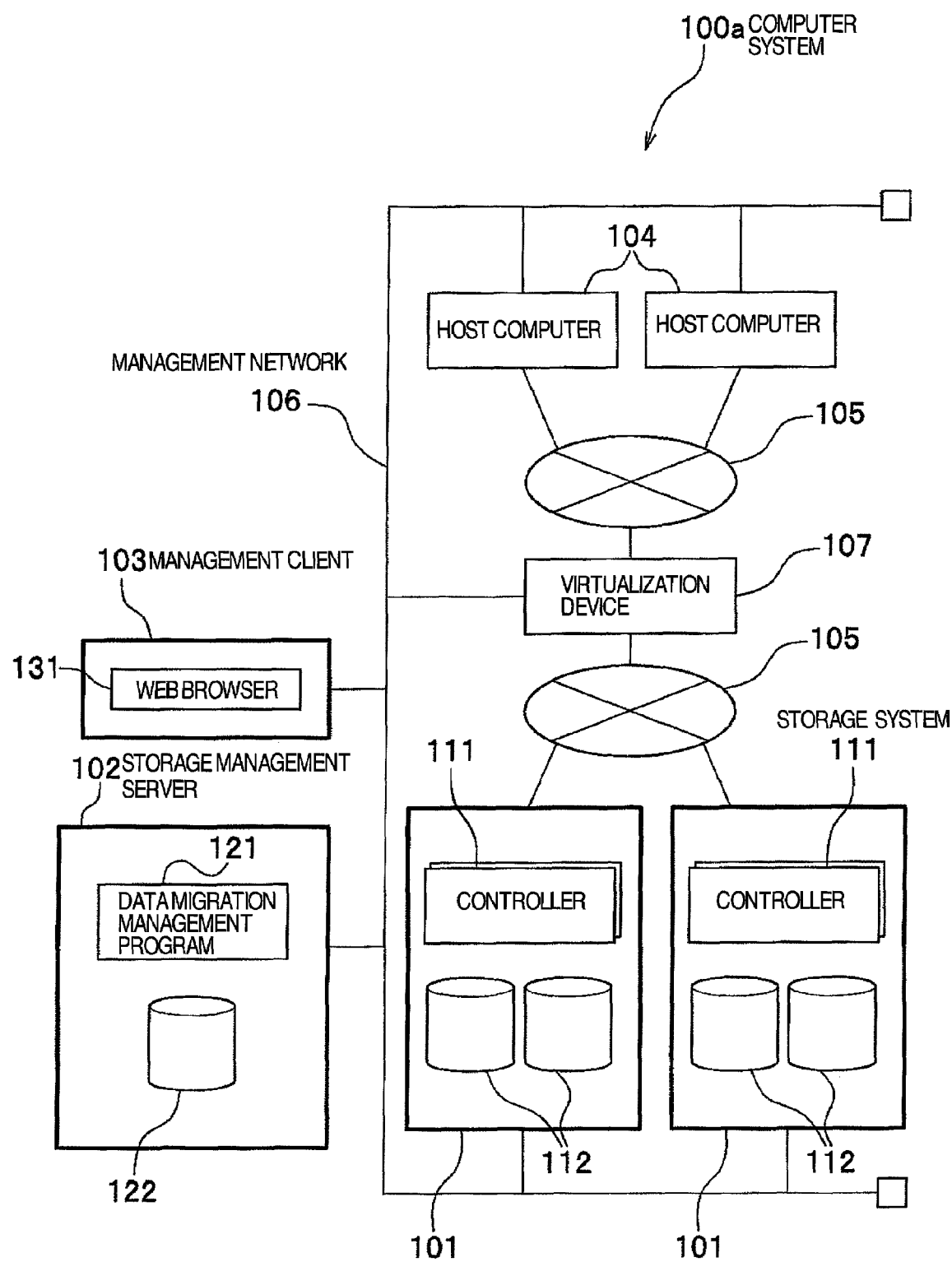
FIG. 16 is a hardware configuration diagram of a computer system according to a second embodiment.

FIG. 16 shows a hardware configuration of a computer system 100a in the second embodiment. A difference from the configuration of FIG. 1 is that the computer system 100a includes a plurality of storage systems 101 and that a virtualization device 107 is added. In the second embodiment, the host computers 104 connect to a plurality of storage systems 101 through the virtualization device 107 so that they can recognize storage resources (storage devices 112) of the plurality of storage systems 101 as logically one storage resource. The virtualization device 107 may, for example, be a virtualization switch, an intelligent switch or a virtualization dedicated device.

If either the host computers 104 or the storage systems 101 have the virtualization function, the virtualization device 107 is not essential.

Figure 17:
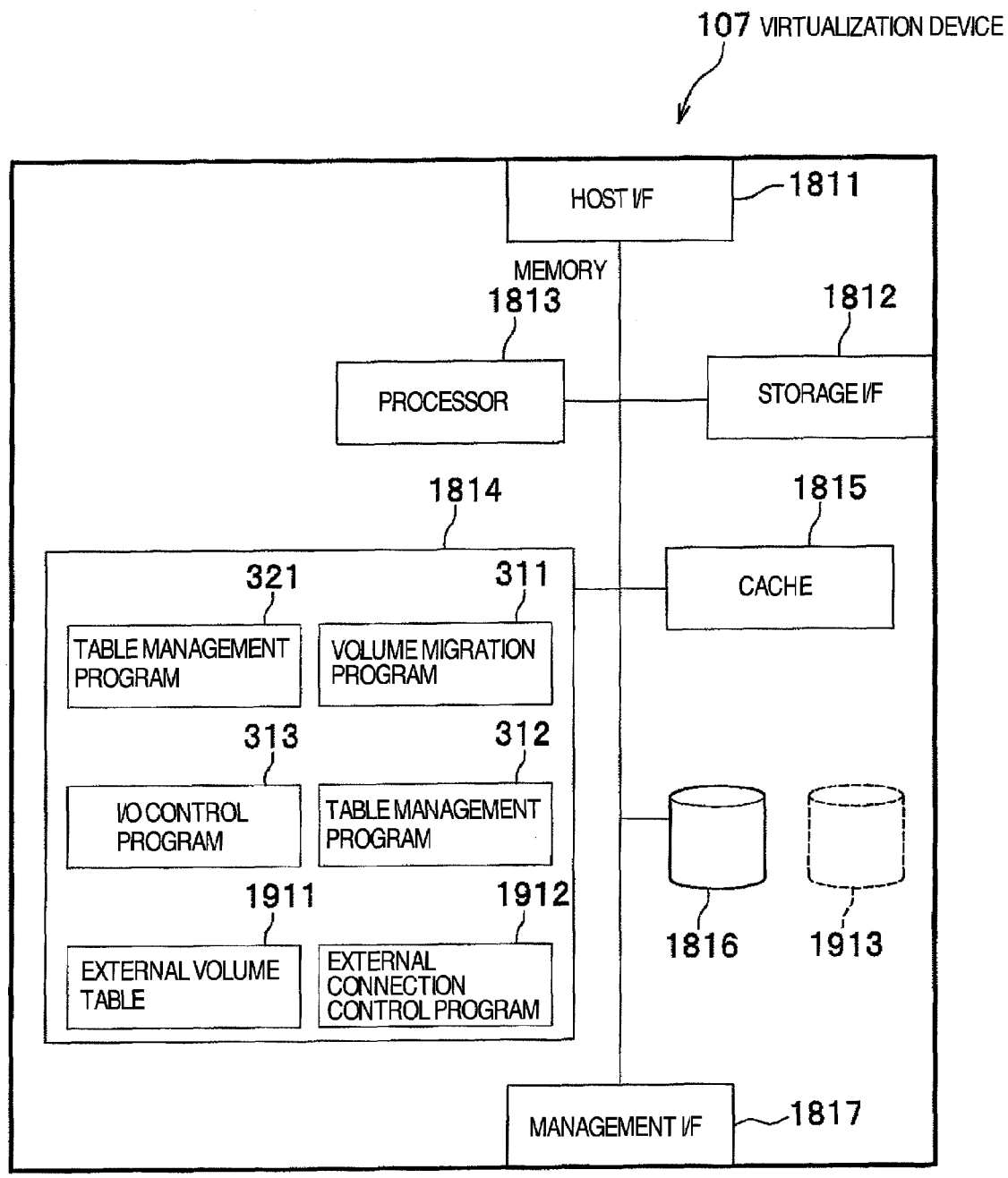
FIG. 17 is a hardware configuration diagram of a virtualization device.

FIG. 17 shows a hardware configuration of the virtualization device 107 (see also FIG. 16 as necessary). The virtualization device 107 has a host interface (I/F) 1811, a storage interface (I/F) 1812, a processor 1813, a memory 1814, a cache 1815, a storage device 1816 and a management interface (I/F) 1817.

The host interface 1811 is a network interface through which the virtualization device 107 connects to the host devices 104 through the storage network 105.

The storage interface 1812 is a network interface through which the virtualization device 107 connects to the storage systems 101 through the storage network 105. Although only one storage interface 1812 is shown in the figure, it is preferably provided separately for each storage system 101.

The processor 1813 virtualizes the storage resources (storage devices 112) provided by the plurality of storage systems 101 as logically one storage resource.

The memory 1814 stores microprograms for a variety of controls. The memory 1814 also stores a volume table 321, an external volume table 1911 (volume information), a volume migration program 311, a table management program 312, an I/O control program 313 and an external connection control program 1912.

The virtualization device 107 has one or more virtual volumes 1913. The virtual volumes 1913 are volumes to which volumes provided by the storage systems 101 are virtually allocated. For simplicity of explanation, the volumes provided by the storage systems 101 are called external volumes. An address space of the virtual volumes 1913 (area in which addresses are mapped) is mapped in an address space of the external volumes. The host computers 104 recognize the virtual volumes 1913 as the storage areas of the storage systems 101 and issues an I/O request to the virtual volumes 1913. Upon receipt of the I/O request from the host computers 104, the virtualization device 107 performs an address conversion between the virtual volumes 1913 and the external volumes, transfers a command to the storage systems 101 and accesses the external volumes. The virtual volumes 1913 can be assigned with the external volumes of the plurality of storage systems 101. With this arrangement, the virtualization device 107 can virtualize the storage resources of the plurality of storage systems 101 as logically one storage resource.

The external connection control program 1912 is a program to control the external connection between the virtualization device 107 and the storage systems 101 (e.g., an address conversion between the virtual volumes 1913 and the external volumes and a command transfer to the storage systems 101).

The external volume table 1911 holds information representing a relation between the virtual volumes 1913 and the external volumes. Details of the external volume table 1911 will be described alter (FIG. 18).

The cache 1815 temporarily stores data to be input/output to and from the storage device 1816.

The management interface 1817 is a network interface by which the virtualization device 107 connects to the management network 106 and to the storage management server 102 and the management client 103.

FIG. 18 shows a structure of the external volume table 1911 (see also FIG. 16 and FIG. 17 as necessary). The external volume table 1911 holds information necessary to virtualize the storage resources (storage devices 112) of the plurality of storage systems 101 as logically one storage resource. The external volume table 1911 associates VOL# 2011, external Port# 2012, IP address 2013 and external VOL# 2014 to each virtual volume 1913.

The VOL# 2011 represents an ID identifying the virtual volumes 1913 in the virtualization device 107.

The external Port# 2012 represents a number identifying a port (a port of the virtualization device 107 for external connection) that transfers an I/O request—which is issued from the host computers 104 to the virtual volumes 1913—to the external volumes.

The IP address 2013 represents an IP address to identify the storage systems 101 having external volumes. As information to identify the storage systems 101 having external volumes, a WWN (World Wide Name) may be used.

The external VOL# 2014 represents a number (VOL# 1111 held in the volume table 321) that identifies external volumes in the storage systems 101.

In the second embodiment, flow charts showing sequences of steps performed in parallelly executing the volume migration are equivalent to FIGS. 11, 14A, 14B and 15, respectively. It is noted, however, that when executing step 1205 in the flow chart of FIG. 11, the first embodiment determines the maximum parallel processing number based on the information of the migration correspondence table 426 and the storage table 421, whereas the second embodiment calculates the maximum parallel processing number based on the information of the external volume table 1911 in addition to the migration correspondence table 426 and the storage table 421.

For example, when the migration source volumes are constructed of external volumes, the maximum parallel processing number is calculated from the controller configuration of the storage systems 101 to which the external volumes belong. The execution sequence management program 412 acquires information on the storage systems 101 to which the external volumes belong, and calculates the maximum parallel processing number according to the flow chart of FIG. 11.

Further, if a migration source volume is an external volume belonging to the storage systems 101 and a migration destination volume is an external volume connected to the virtualization device and belonging to a storage system 101 other than the storage system 101 to which the migration source volume belongs or a volume belonging to the virtualization device 107, data in the migration source volume is stored in the cache of the virtualization device during the volume migration. So, the maximum parallel processing number is calculated from the controller configuration of the virtualization device 107. The execution sequence management program 412 acquires information of the virtualization device 107 from the storage table 421 and calculates the maximum parallel processing number according to the flow chart of FIG. 11.

Figure 19:
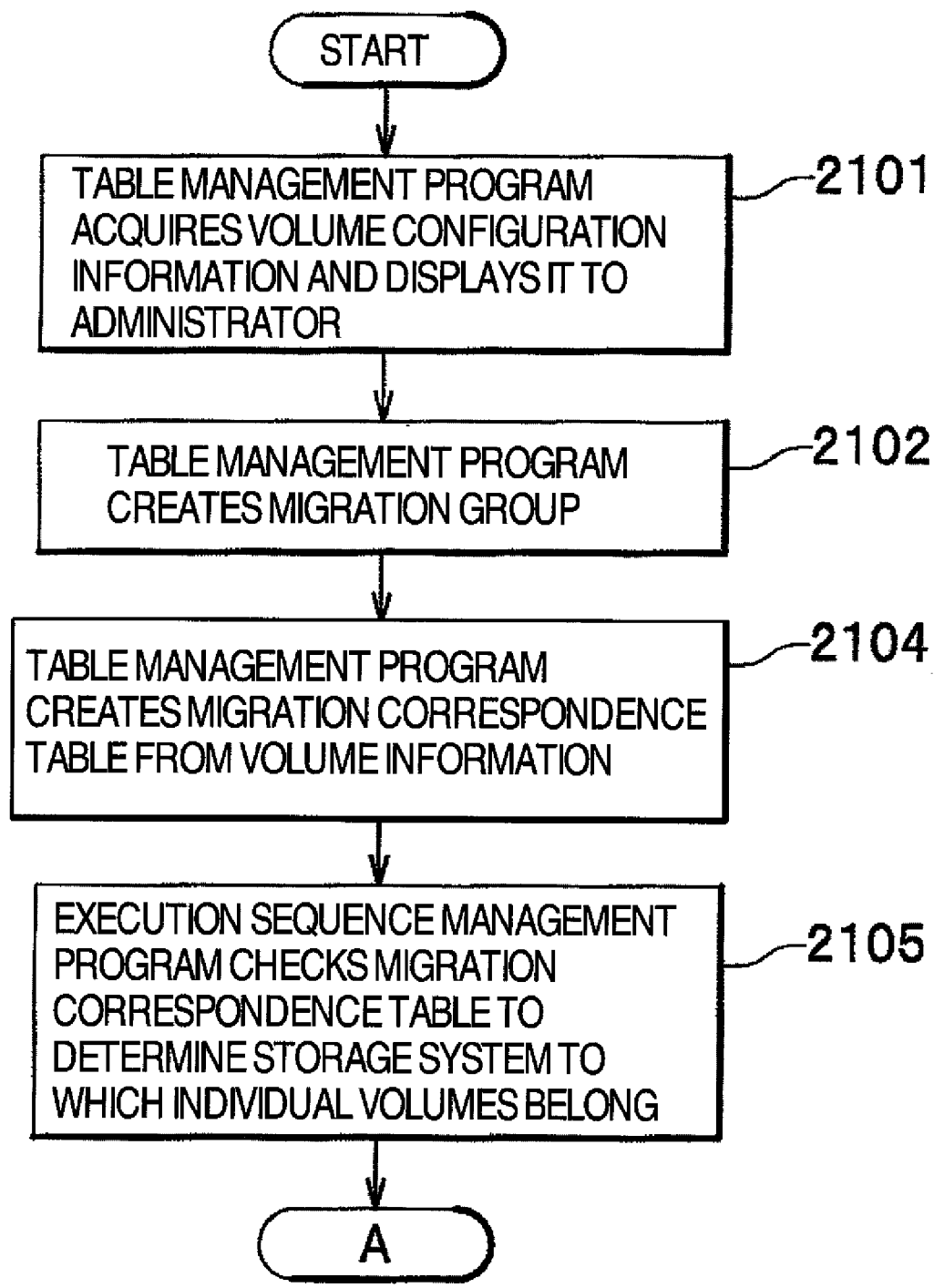
FIG. 19 is a flow chart showing a sequence of steps performed to determine a maximum parallel processing number during data migration when the virtualization device is used.
Figure 20:
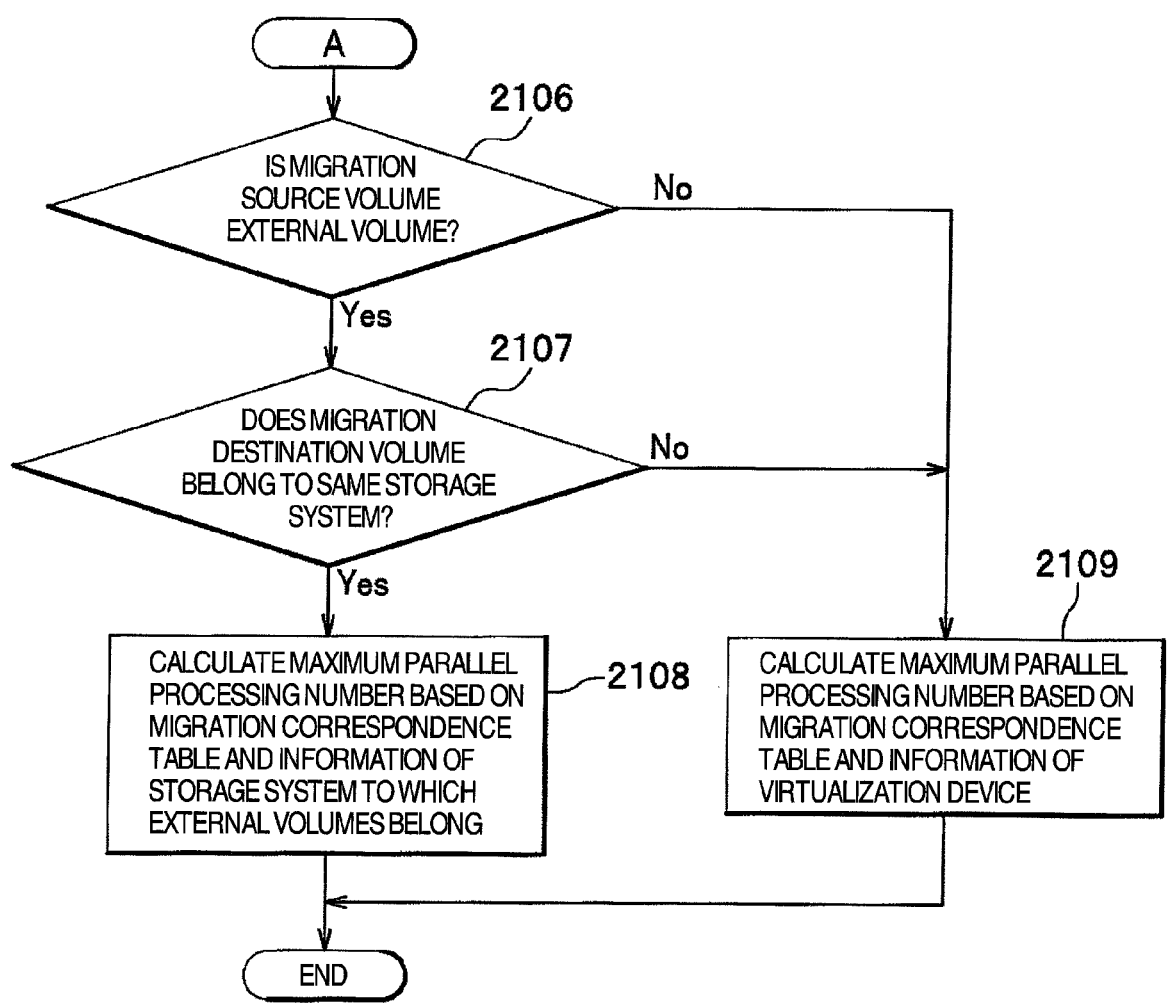
FIG. 20 is a flow chart showing a sequence of steps performed to determine a maximum parallel processing number during data migration when the virtualization device is used.

FIG. 19 and FIG. 20 are flow charts showing sequences of steps performed to determine the maximum parallel processing number during the data migration from the migration group set by the administrator. Steps 2101 to 2104 are similar to steps 1201 to 1204 of FIG. 11. So their detailed descriptions are omitted.

First, the table management program 413, one of the data migration management programs 121, acquires volume configuration information from the volume table 422 and displays it to the administrator through the Web browser 131 (GUI) of the management client 103 (step 2101).

Next, the administrator creates a migration group based on the information displayed in step 2101. The migration group is generated in the following two steps. First, a migration group ID is set. Next, a volume that serves as a migration source is added to the migration group.

The table management program 413 then adds information of the new migration group to the migration group table 423 and, for the volume added to the migration group, changes MG ID 512 of the volume table 422 to the migration group ID, thus generating the migration group (step 2102).

Next, the administrator selects a volume as the migration destination for each of the volumes added to the migration group.

The table management program 413 creates a migration correspondence table 426 from the information of the volume table 422 and the information of the selected volumes (step 2104).

The execution sequence management program 412 determines, from the migration correspondence table 426, the storage system to which the migration source and destination volumes belong and acquires its information (step 2105).

From the result of step 2105, the execution sequence management program 412 checks whether the migration source volume is the external volume or internal volume of the virtualization device (step 2106).

If the migration source volume is found to be the internal volume (step 2106, No), the program executes step 2109.

If the migration source volume is found to be the external volume (step 2106, Yes), the execution sequence management program 412 checks if the migration destination volume belongs to the same storage system as the migration source volume (step 2107).

If the migration destination volume belongs to the same storage system 101 as the migration source volume (step 2107, Yes), the execution sequence management program 412 calculates the maximum parallel processing number as in step 1205 from the information of the storage system 101 to which the external volume belongs and the information of the migration correspondence table 426 (step 2108).

If the migration destination volume does not belong to the same storage system 101 as the migration source volume (step 2107, No), the execution sequence management program 412 calculates the maximum parallel processing number as in step 1205 from the information of the virtualization device 107 and the information of the migration correspondence table 426 (step 2109).

As described above, with the computer system 100*a* of the second embodiment, even when the virtualization device 107 virtualizes storage resources of a plurality of storage systems 101 as logically one storage resource, a plurality of volumes can be parallelly migrated (relocated) efficiently by selecting volumes whose physical resources do not conflict (or have few conflicts).

It is noted that the present invention is not limited to the configurations described in the above embodiments and that various modifications may be made to hardware configurations and flow charts without departing from the spirit of this invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system having one or more host computers, a storage system to store data used by the host computers and a storage management server to manage a storing of the data in the storage system, all these being interconnected through a network;
    wherein the storage system comprises:
    one or more storage devices to store the data used by the host computers; and
    one or more controllers to control the storage devices, the controllers storing the data in the storage devices by volumes, the volume being a physical or logical unit for data storage;
    wherein the storage management server comprises:
    a memory unit to store physical configuration information including at least information on a physical configuration of the controllers or storage devices of the storage system; and
    a processing unit to manage the storage devices of the storage system by the volumes;
    wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts, and
    wherein the processing unit of the storage management server references the physical configuration information stored in the memory unit, calculates a maximum parallel processing number, namely the maximum number of the volumes that can be parallelly migrated and for which physical conflicts of the controllers or storage devices in the storage system are less than a predetermined level, and executes the parallel migration operation on the maximum parallel processing number of volumes.

2. A computer system according to claim 1, wherein, when the migration operation on one of the volumes being parallelly migrated is finished, the processing unit of the storage management server references the physical configuration information stored in the memory unit, evaluates physical conflicts of the controllers or storage devices in the storage system for each volume, selects volumes with few conflicts based on the evaluation, and executes the parallel migration operation on the selected volumes.

3. A computer system according to claim 1, further including:
    a virtualization device connected through the network to the host computers, a plurality of the storage systems and the storage management server and adapted to virtualize the plurality of storage systems as logically one storage system,
    wherein the processing unit of the storage management server causes the virtualization device to reference volume information including at least information on volumes of the plurality of storage systems held in the virtualization device and to execute a parallel migration operation on the two or more volumes in the plurality of virtualized storage systems.

4. A computer system having one or more host computers, a storage system to store data used by the host computers and a storage management server to manage a storing of the data in the storage system, all these being interconnected through a network;
    wherein the storage system comprises:
    one or more storage devices to store the data used by the host computers; and
    one or more controllers to control the storage devices, the controllers storing the data in the storage devices by volumes, the volume being a physical or logical unit for data storage;
    wherein the storage management server comprises:
    a memory unit to store physical configuration information including at least information on a physical configuration of the controllers or storage devices of the storage system; and
    a processing unit to manage the storage devices of the storage system by the volumes;
    wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
    wherein the physical configuration information associates each of the volumes to one of a plurality of (Redundant Arrays of Inexpensive Disks (RAID) group, and
    wherein, when selecting volumes to be parallelly migrated, the processing unit of the storage management server references the physical configuration information stored in the memory unit and preferentially selects migration source volumes belonging to RAID groups other than those to which the already selected volumes belong.

5. A computer system according to claim 4, wherein, when selecting volumes to be parallelly migrated, the processing unit of the storage management server references the physical configuration information stored in the memory unit and preferentially selects migration destination volumes belonging to RAID groups other than those to which the already selected volumes belong.

6. A computer system having one or more host computers, a storage system to store data used by the host computers and a storage management server to manage a storing of the data in the storage system, all these being interconnected through a network;
    wherein the storage system comprises:
    one or more storage devices to store the data used by the host computers; and
    one or more controllers to control the storage devices, the controllers storing the data in the storage devices by volumes, the volume being a physical or logical unit for data storage;

wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
wherein the physical configuration information contains a value representing the number of volumes that can be parallelly migrated for each of the controllers in the storage system, and
wherein, when selecting volumes to be parallelly migrated, the processing unit of the storage management server references the physical configuration information stored in the memory unit and selects volumes so that the number of selected volumes does not exceed the number of parallelly migratable volumes for each of the controllers in the storage system.

7. A computer system having one or more host computers, a storage system to store data used by the host computers and a storage management server to manage a storing of the data in the storage system, all these being interconnected through a network;
wherein the storage system comprises:
one or more storage devices to store the data used by the host computers; and
one or more controllers to control the storage devices, the controllers storing the data in the storage devices by volumes, the volume being a physical or logical unit for data storage;
wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
wherein the memory unit of the storage management server further stores migration group information that associates identifiers of migration source groups of migration source volumes with migration destination layers representing physical performances of the migration destination volumes, and
wherein the processing unit of the storage management server references the physical configuration information and the migration group information stored in the memory unit and selects, as migration destination volumes, those volumes belonging to the migration destination layers corresponding to the migration source groups.

8. A data migration method in a computer system, the computer system having one or more host computers, a storage system to store data used by the host computers and a storage management server to manage a storing of the data in the storage system, all these being interconnected through a network;
wherein the storage system comprises:
one or more storage devices to store the data used by the host computers; and
one or more controllers to control the storage devices, the controllers storing the data in the storage devices by volumes, the volume being a physical or logical unit for data storage;
wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts, and
wherein the processing unit of the storage management server references the physical configuration information stored in the memory unit, calculates a maximum parallel processing number, namely the maximum number of the volumes that can be parallelly migrated and for which physical conflicts of the controllers or storage devices in the storage system are less than a predetermined level, and executes the parallel migration operation on the maximum parallel processing number of volumes.

9. A data migration method according to claim 8, wherein, when the migration operation on one of the volumes being parallelly migrated is finished, the processing unit of the storage management server references the physical configuration information stored in the memory unit, evaluates physical conflicts of the controllers or storage devices in the storage system for each volume, selects volumes with few conflicts based on the evaluation, and executes the parallel migration operation on the selected volumes.

10. A data migration method according to claim 8, wherein the computer system further includes a virtualization device connected through the network to the host computers, a plurality of the storage systems and the storage management server and adapted to virtualize the plurality of storage systems as logically one storage system, and
wherein the processing unit of the storage management server causes the virtualization device to use volume information including at least information on volumes of the plurality of storage systems held in the virtualization device and to execute a parallel migration operation on the two or more volumes in the plurality of virtualized storage systems.

11. A data migration method in a computer system, the computer system having one or more host computers, a storage system to store data used by the host computers and a storage management server to manage a storing of the data in the storage system, all these being interconnected through a network;

wherein the storage system comprises:
one or more storage devices to store the data used by the host computers; and
one or more controllers to control the storage devices, the controllers storing the data in the storage devices by volumes, the volume being a physical or logical unit for data storage;
wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
wherein the physical configuration information associates each of the volumes to one of a plurality of Redundant Arrays of Inexpensive Disks (RAID) groups, and
wherein, when selecting volumes to be parallelly migrated, the processing unit of the storage management server references the physical configuration information stored in the memory unit and preferentially selects migration source volumes belonging to RAID groups other than those to which the already selected volumes belong.

12. A data migration method according to claim 11, wherein, when selecting volumes to be parallelly migrated, the processing unit of the storage management server references the physical configuration information stored in the memory unit and preferentially selects migration destination volumes belonging to RAID groups other than those to which the already selected volumes belong.

13. A data migration method in a computer system, the computer system having one or more host computers, a storage system to store data used by the host computers and a storage management server to manage a storing of the data in the storage system, all these being interconnected through a network;
wherein the storage system comprises:
one or more storage devices to store the data used by the host computers; and
one or more controllers to control the storage devices, the controllers storing the data in the storage devices by volumes, the volume being a physical or logical unit for data storage;
wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
wherein the physical configuration information contains a value representing the number of volumes that can be parallelly migrated for each of the controllers in the storage system, and
wherein, when selecting volumes to be parallelly migrated, the processing unit of the storage management server references the physical configuration information stored in the memory unit and selects volumes so that the number of selected volumes does not exceed the number of parallelly migratable volumes for each of the controllers in the storage system.

14. A data migration method in a computer system, the computer system having one or more host computers, a storage system to store data used by the host computers and a storage management server to manage a storing of the data in the storage system, all these being interconnected through a network;
wherein the storage system comprises:
one or more storage devices to store the data used by the host computers; and
one or more controllers to control the storage devices, the controllers storing the data in the storage devices by volumes, the volume being a physical or logical unit for data storage;
wherein the storage management server comprises:
a memory unit to store physical configuration information including at least information on a physical configuration of the controllers or storage devices of the storage system; and
a processing unit to manage the storage devices of the storage system by the volumes;
wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts,
wherein the memory unit of the storage management server further stores migration group information that associates identifiers of migration source groups of migration source volumes with migration destination layers representing physical performances of the migration destination volumes, and
wherein the processing unit of the storage management server references the physical configuration information and the migration group information stored in the memory unit and selects, as migration destination volumes, those volumes belonging to the migration destination layers corresponding to the migration source groups.

15. A storage management server in a computer system, the storage management server being connected through a network to one or more host computers and a storage system, wherein the storage system stores data used by the host computers in one or more storage devices and controls the storage devices by one or more controllers,
wherein the controllers store the data in the storage devices by volumes, the volumes being physical or logical units for data storage;
wherein the storage management server comprising:
a memory unit to store physical configuration information including at least information on a physical configuration of the controllers or storage devices of the storage system; and a processing unit to manage the storage devices of the storage system by the volumes;

wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts, and wherein the processing unit references the physical configuration information stored in the memory unit, calculates a maximum parallel processing number, namely the maximum number of the volumes that can be parallelly migrated and for which physical conflicts of the controllers or storage devices in the storage system are less than a predetermined level, and executes the parallel migration operation on the maximum parallel processing number of volumes.

16. A storage management server according to claim 15, wherein, when the migration operation on one of the volumes being parallelly migrated is finished, the processing unit references the physical configuration information stored in the memory unit, evaluates physical conflicts of the controllers or storage devices in the storage system for each volume, selects volumes with few conflicts based on the evaluation, and executes the parallel migration operation on the selected volumes.

17. A storage management server in a computer system, the storage management server being connected through a network to one or more host computers and a storage system, wherein the storage system stores data used by the host computers in one or more storage devices and controls the storage devices by one or more controllers, wherein the controllers store the data in the storage devices by volumes, the volumes being physical or logical units for data storage;

wherein the storage management server comprising:

a memory unit to store physical configuration information including at least information on a physical configuration of the controllers or storage devices of the storage system; and a processing unit to manage the storage devices of the storage system by the volumes;

wherein, when two or more volumes of data in the storage system are parallelly migrated to the same number of other volumes, the parallel migration operation is executed by referencing the physical configuration information stored in the memory unit, evaluating physical conflicts of the controllers or storage devices in the storage system for each volume and, based on the evaluation, selecting volumes with few conflicts, wherein the physical configuration information associates each of the volumes to one of a plurality of (Redundant Arrays of Inexpensive Disks (RAID) groups, and wherein, when selecting volumes to be parallelly migrated, the processing unit references the physical configuration information stored in the memory unit and preferentially selects migration source volumes belonging to RAID groups other than those to which the already selected volumes belong.

* * * * *